March 28, 1961 D. B. DOANE 2,977,437
ELECTRICALLY ACTUATED ROTARY VALVE FOR ZONE HEAT CONTROL
Filed Dec. 24, 1959 5 Sheets-Sheet 1

INVENTOR
DANIEL B. DOANE
BY Cameron, Kerkam + Sutton
ATTORNEYS

March 28, 1961    D. B. DOANE    2,977,437
ELECTRICALLY ACTUATED ROTARY VALVE FOR ZONE HEAT CONTROL
Filed Dec. 24, 1959    5 Sheets-Sheet 2

INVENTOR
DANIEL B. DOANE
BY Cameron, Kerkam & Sutton
ATTORNEYS

March 28, 1961 D. B. DOANE 2,977,437
ELECTRICALLY ACTUATED ROTARY VALVE FOR ZONE HEAT CONTROL
Filed Dec. 24, 1959 5 Sheets-Sheet 3

INVENTOR
DANIEL B. DOANE
BY Cameron, Kerkam & Sutton
ATTORNEYS

March 28, 1961 D. B. DOANE 2,977,437
ELECTRICALLY ACTUATED ROTARY VALVE FOR ZONE HEAT CONTROL
Filed Dec. 24, 1959 5 Sheets-Sheet 4

INVENTOR
DANIEL B. DOANE
BY
Cameron, Kerkam & Sutton
ATTORNEYS

March 28, 1961 D. B. DOANE 2,977,437
ELECTRICALLY ACTUATED ROTARY VALVE FOR ZONE HEAT CONTROL
Filed Dec. 24, 1959 5 Sheets-Sheet 5

INVENTOR
DANIEL B. DOANE

BY Cameron, Kerkam & Sutton
ATTORNEYS

United States Patent Office 2,977,437
Patented Mar. 28, 1961

2,977,437

ELECTRICALLY ACTUATED ROTARY VALVE FOR ZONE HEAT CONTROL

Daniel B. Doane, N. Main St., Essex, Conn.

Filed Dec. 24, 1959, Ser. No. 861,986

20 Claims. (Cl. 200—81.9)

This invention relates to electrically actuated rotary valves and more particulraly to such valves for use in zone heating and/or cooling systems and the use of a plurality of such valves in such systems.

Inasmuch as the invention is applicable to systems employing either air or liquid as the heating or cooling medium, it is to be understood that, as used herein, the term "valve" or "valve member" includes vane or damper type air valves as well as the rotary types of liquid control valves, and that the term "conduit" includes any structure through which a heating or cooling medium is adapted to flow, including ducts, pipes and the bodies or casings of valves which may be connected into pipe or duct systems.

Heretofore it has been general practice to employ separate circulating means and a multiplicity of control components, such as flow control valves, relays, and so forth for each zone in zoned heating and cooling systems. The original cost of such equipment is high, its installation is expensive and the power consumption of such systems is excessive. Those skilled in the art have long sought an alternative whereby valves that are compact, low in cost and easily installed and maintained could be substituted for the multiplicity of circulating means and associated equipment to which reference has been made in the foregoing. In response to this recognized need, a number of electrically operated valves have been placed on the market, but such valves have not gained general acceptance because of their large size, high price and further because of the maintenance difficulties inherent in their designs. Further-, more, the operating characteristics of valves heretofore available have been such as to contribute to objectionable water hammer, pounding and thermal surging in the heating or cooling system in which they have been installed.

Accordingly, it is the primary object of the present invention to overcome the above-described objections and excessive cost by providing novel thermostatically controlled, electrically actuated rotary valves in which the motor driving the valve also operates the associated control switches, said motor and switches being associated in a compact assembly which can be manufactured economically and which can be easily installed and maintained in service.

Another object is to provide such electrically actuated rotary valves which are so designed that they can be readily installed in existing heating or cooling systems as well as in new heating or cooling installations.

Another object is to provide a novel design feature which will permit the motor and switch assembly to be easily separated from and subsequently reattached to the valve so that the valve may be installed separately in the heating or cooling system, thereby protecting other parts of the assembly against damage due to mishandling to which they would otherwise be subjected during the operation of installing the valve in the piping or ducts of the heating or cooling system, including damage caused by excessive heating of the valve body when the valve is connected in the system by means of soldered joints.

Another object is to provide such novel electrically actuated rotary valves in which the motor controls are driven by and are arranged about the motor driven shaft so that they are readily accessible for making necessary electrical connections at the time of installation and for maintenance of the wiring circuits in service.

Another object is to provide such rotary valves having a novel driving connection between the motor driven shaft and the valve stem in order to provide a flexible coupling which permits self-alignment of the connection between the motor driven shaft and the rotating member of the valve.

Another object is to provide such rotary valves having a novel design feature which permits easy removal from the assembly of all electrical elements without disturbing the mechanical elements of the valve.

Another object is to provide such rotary valves with a novel switch construction which effectively prevents stalling of the valve in partially open or closed position in the event that the controlling thermostat should be reset while the motor is opening or closing the valve.

Other and further objects of the present invention will appear from the following description of the illustrative embodiments thereof, it being one of these objects to provide such rotary valves which are inexpensive and which are easy to install and to maintain.

In the accompanying drawings, in which like reference characters indicate like parts, two illustrative embodiments of the rotary valves of the present invention are shown, together with suitable electric circuits for actuation of the valves in typical zoned heating systems. These illustrations of the present invention are described hereinafter to provide an understanding of this invention and should in no way be construed as defining or limiting the same.

Figure 1:
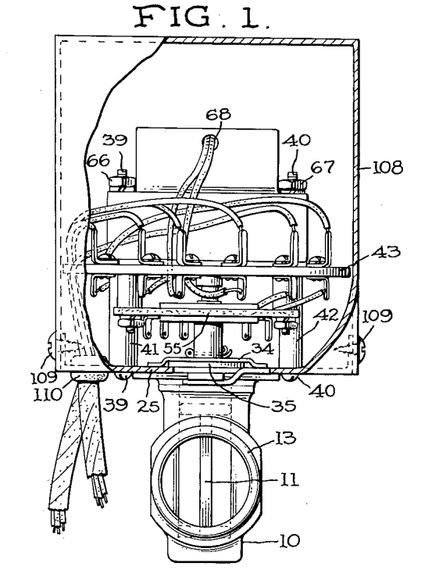
Figs. 1 is a view, partly in section, of an illustrative embodiment of an electrically actuated rotary valve in accordance with present invention showing the same in assembled position.
Figure 2:
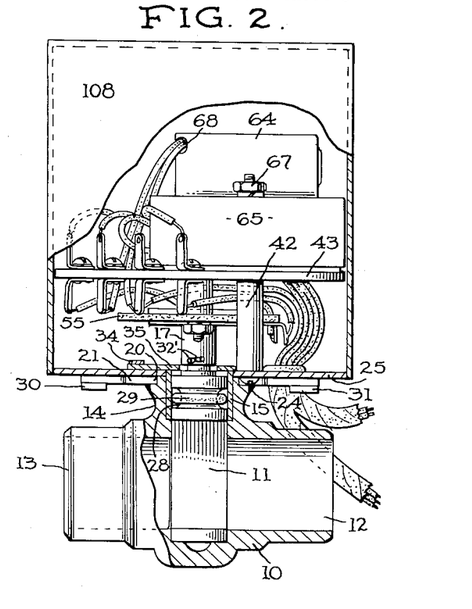
Fig. 2 is a view partly in section of the embodiment of Fig. 1 as seen from the right therein.

Referring now to the several figures and more particularly to Figs. 1-5, a suitable valve body 10 supports, for rotation therewithin through 360°, a rotary valve member 11, which is shown in open position in Figs. 1 and 2, and body 10 is provided with a heating medium inlet port 12 and an outlet port 13 for connection in known manner in a suitable heating medium circulating system. Rotary valve member 11 is provided with an outer annular groove 28 carrying an appropriate sealing means 29 for engagement with the wall of central bore 15 to form a fluidtight seal therewith. Body 10 is provided with extension 14 which has a central bore 15.

Extension 14 is annularly cut away at 20 to provide a seat for a disc 21, disc 21 being provided with diametrically opposed wings 22 and 23. Disc 21 is suitably secured to extension 14 by brazing or welding as at 24.

Figures 3, 4, 5:
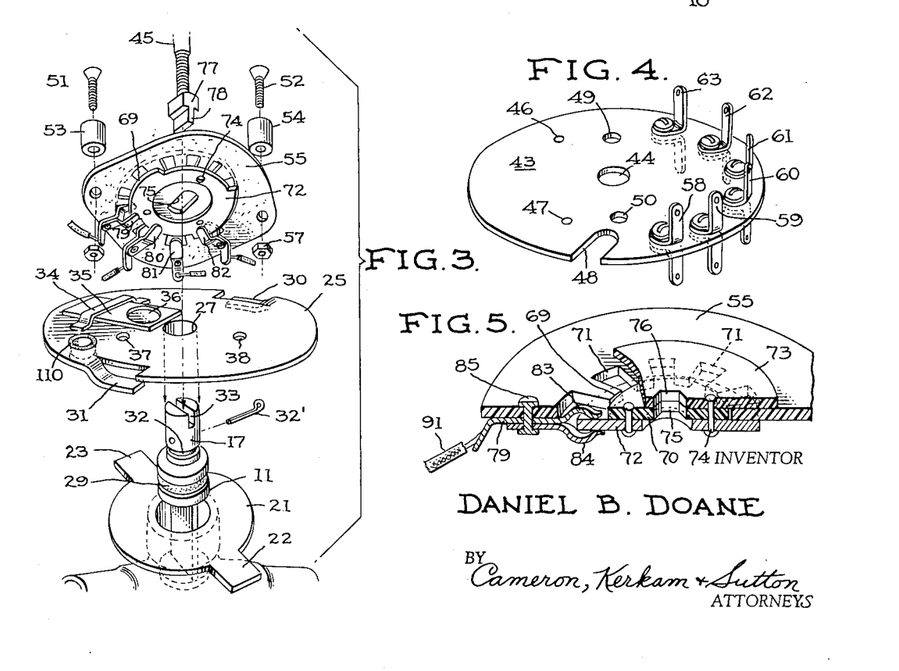
Fig. 3 is an exploded view of a portion of the embodiment of Fig. 1 showing the relative positions of the control switches associated with the valve driving motor, the base plate for the motor and switch assembly and the valve structure.
Fig. 4 is a perspective view of the motor support and terminal plate.
Fig. 5 is a sectional perspective view of the motor control switch unit.

Hole 27 in circular motor assembly base plate 25 receives the stem 17 of rotary valve member 11. Valve stem 17 is provided with an annular slot 32 and an axial diametric slot 33 at its upper end. Base plate 25 is provided with diametrically opposed depending brackets 30 and 31 into which ears 22 and 23, respectively, are rotated to lock base plate 25 in assembled position with respect to valve body 10. Base plate 25 is provided with a bridge 34 which positions and holds in place a retainer plate 35, retainer plate 35 being provided with a hole 36 through which the valve stem 17 is passed in assembly and is then secured in place as by a suitable spring washer in slot 32 or by a cotter pin 32'. Base plate 25 may be rotated either to engage brackets 30 and 31 with or to disengage them from ears 22 and 23, thus allowing base plate 25 and its associated motor structure to be readily connected to or disconnected from the valve body 10.

Base plate 25 is provided with a pair of openings 37 and 38 to receive bolts 39 and 40, respectively, which pass through spacers 41 and 42, spacers 41 and 42 supporting a motor and terminal plate 43 of suitable electrical insulating material. Motor and terminal plate 43 is shown in Fig. 4 and is provided with a central aperture 44 for motor driven shaft 45 and with a pair of openings 46 and 47 through which bolts 39 and 40 pass, respectively. A slot 48 is provided in the outer edge of plate 43 to permit passage of the several wires used in the motor circuit as will appear more fully hereinafter. Holes 49 and 50 are provided in plate 43 to receive bolts 51 and 52, respectively, of spacers 53 and 54 which support switch plate 55, switch plate 55 being held in assembled position by nuts 56 and 57 threaded on bolts 51 and 52, respectively. A suitable number of electrical terminal elements may be mounted about the periphery of plate 43 and are here shown as six in number at 58, 59, 60, 61, 62 and 63.

Shaft 45 is driven by a suitable unidirectional electric motor shown schematically at 89 in Figs. 6, 7, 8 and 9, which is mounted in a casing 64 and drives through suitable reduction gearing, not shown, housed in a casing 65, casings 64 and 65 preferably being formed as an integral unit and being secured to plate 43 by bolts 39 and 40 which pass therethrough and are held in place by nuts 66 and 67, respectively. Housing 64 is suitably apertured at 68 for the motor lead wires, as will appear more fully hereinafter.

Switch plate 55, referred to above, shown in detail in Figs. 3 and 5, is made of suitable insulating material such as plastic or fibre, and is centrally and circularly cut away at 69 to receive a rotatable carrier disc 70 of similar material. A plurality of radially disposed pockets 71 extend outwardly in plate 55 from central aperture 69 at equally spaced intervals thereabout to receive fixed electrical switch elements, as will appear more fully hereinafter. A rotatable conductive metal switch disc 72 is mounted beneath carrier disc 70 and an insulating disc 73 is mounted above disc 70, discs 72 and 73 extending beyond the periphery of opening 69 and discs 70, 72 and 73 being united by suitable fastening means such as rivets 74. Discs 70 and 73 are provided with centrally disposed coincident rectangular apertures 75 and 76, respectively. Motor driven shaft 45 is provided with a substantially rectangular head 77 which fits in rectangular openings 75 and 76 and which has an axially extending key 78 engaging slot 33 in the upper end of valve stem 17 when the unit is assembled.

Four fixed electrical switch elements are mounted radially on disc 55 in adjacent openings 71 and are seen at 79, 80, 81 and 82 in Fig. 3. One such switch element 79 is seen in section in Fig. 5 and comprises a pair of opposed metal fingers 83 and 84 which resiliently engage rotatable disc 72 and are held beneath disc 55 by suitable means such as rivet 85.

Figure 6:
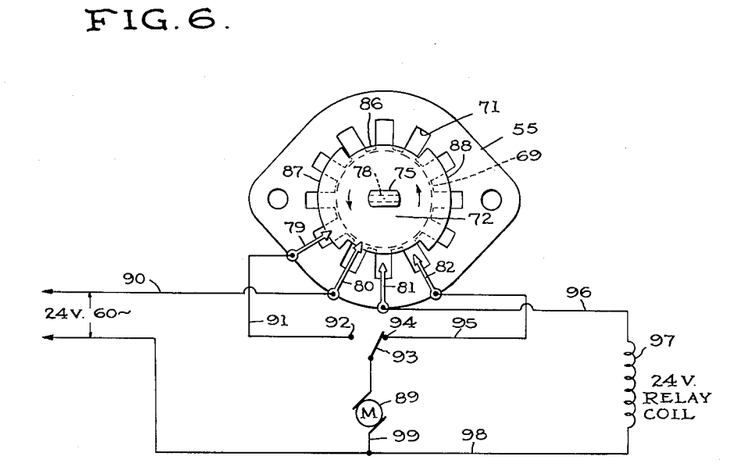
Fig. 6 is a schematic circuit diagram illustrating the operation of the valve motor control switches.

The shape of metal switch disc 72 is best seen in Fig. 6 where the contacts 79-82 are shown schematically. Disc 72 comprises a central circular portion 86 having diametrically opposed extensions or segments 87 and 88, each such extension 87 and 88 extending on each side of the common medial diameter over an arc of approximately 50°.

Referring now more particularly to Fig. 6, it will be seen that a suitable source of current for the electric motor 89, such as the secondary windings of a transformer delivering a 24 volt 60 cycle current, is connected by wire 90 to contact 80 which is in constant engagement with circular portion 86 of disc 72. Contact 79 is connected by wire 91 to one side 92 of thermostatic switch 93. Side 94 of thermostatic switch 93 is connected by wire 95 to contact 82. Contact 81 is connected by wire 96 to one side of a suitable relay coil 97 and the other side of relay coil 97 is connected by wire 98 to the source of current. Motor 89 is connected on one side to thermostatic switch 93 and is connected on its other side by wire 99 to wire 98. Contacts 79, 81 and 82 are all shorter than contact 80 and extend radially inwardly only far enough to engage segmental extensions 87 and 88 as disc 72 rotates.

Fig. 6 illustrates the disposition of the elements of the rotary switch when valve 11 is closed. When the zone served by the valve cools down, thermostat 93 changes position and engages contact 92. Current then flows through wire 90, contact 80 to disc 72, contact 79, wire 91, thermostatic switch 93, motor 89, wire 99 and wire 98 to energize motor 89. Rotation of motor 89 drives shaft 45 and rotates disc 72 and valve 11 in a counterclockwise direction as viewed in Fig. 6. Rotation of disc 72 brings extension 87 thereof into engagement with contact 81. At this point valve 11 is partially opened. Engagement of extension 87 with contact 81 energizes relay 97 through wires 96 and 98 and relay 97 is used to close a suitable circuit to the motor of the heating medium circulating pump, as will appear more fully hereinafter, to start circulation of the heating medium through the conduit to which valve body 10 is connected. Since valve 11 is only partially opened at this point, the heating medium is introduced into the system gradually, through valve body 10, thus eliminating vibration or hammering caused by too rapid expansion of the piping system.

Motor 89 continues to drive disc 72 and to open rotating valve member 11 until rotating valve member 11 reaches the fully opened position. At this point, extension 87 breaks away from contact 79 and the circuit to motor 89 is interrupted. Just before contact 79 disengages from extension 87, extension 87 engages contact 82. When demand for heat in the zone is satisfied, thermostatic switch 93 returns to the position shown in Fig. 6 and into engagement with side 94. The circuit for motor 89 is then completed through contact 82 and wire 95 and motor 89 is energized, rotating valve member 11 in a counterclockwise direction (Fig. 6) toward the closed position. Contact 82 remains in engagement with segment 87 until rotating valve member 11 is in the closed position, at which time extension 87 rotates out of engagement with contact 82 and segment 88 comes into engagement with contact 79. Motor 89 is then deenergized and rotating valve member 11 remains closed until a demand for heat again causes thermostat 93 to engage side 92. It should be noted that contact 81 disengages from extension 87 of disc 72 before engagement by contact 82 is broken so that relay 97 is deenergized and the motor of the heating medium circulating pump is deenergized and circulation of the heating medium through valve body 10 ceases before rotating valve member 11 reaches the fully closed position.

Figure 7:
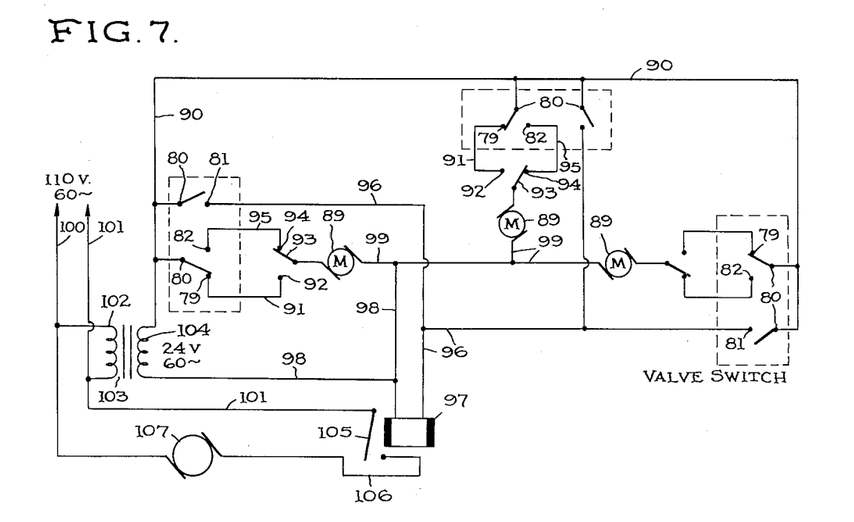
Fig. 7 is a schematic represention of a suitable zoned heat control circuit including electrically actuated rotary valves as shown in Fig. 1.

In Fig. 7 the switch circuit of Fig. 6 is shown schematically as applied to a three zone heating installation having a valve for each zone driven by its motor 89. It is to be understood that the number of zones may be varied to meet the requirements of any particular installation and that the three zones of Fig. 7 are representative and illustrative only. In Fig. 7 wires 100 and 101 lead from any suitable source of 110 volt 60 cycle alternating current and connect to the primary windings 102 of a suitable transformer 103 which has suitable secondary windings 104 to provide 24 volt 60 cycle alternating current to wires 90 and 98 as described above with respect to Fig. 6. Wire 101 connects to switch 105 operated by relay 97 and switch 105 is connected by wire 106 to one side of motor 107 of the heating medium circulating pump. The other side of motor 107 is connected to wire 100.

The circuits of Fig. 7 from each zone control to the common relay 97 for energizing circulating motor 107 are so arranged, i.e., by inclusion of the normally open contacts 81, that demand in one zone with energization of motor 107 cannot, through feed-back, actuate valve motors 89 for any of the other zones. With this circuit construction no special devices such as resistances or separate switches are required to eliminate feed-back.

It is to be understood that, through suitable circuits not shown and in known manner, the operation of the furnace and associated controls and equipment will be initiated and maintained under the control of relay 97 during the period when motor 107 is driving the heating medium circulating pump so that the heating medium passing through valve body 10 is maintained at the temperature required to provide heat to the zone where demand has occurred.

Figure 8:
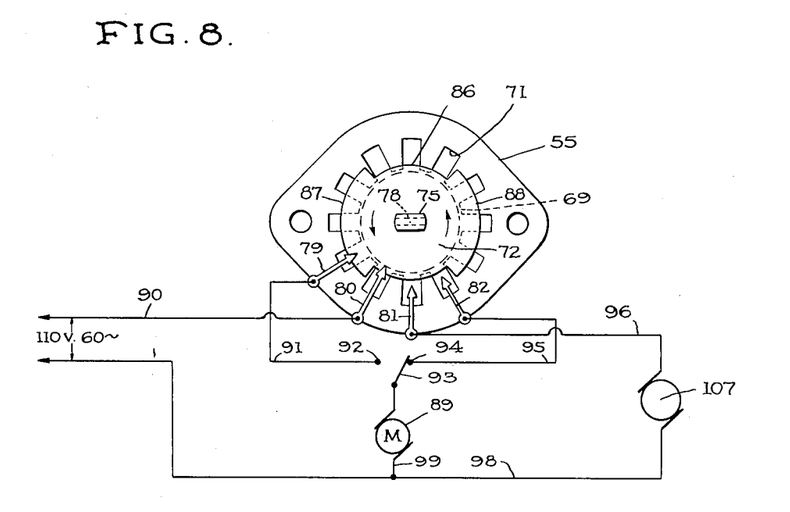
Fig. 8 is a schematic circuit diagram illustrating a modification of the circuit shown in Fig. 6 wherein the external electrical load is connected directly to the valve motor control switch.

Fig. 8 shows schematically a circuit similar to that of Fig. 6 but for use where the rotary switch and motors 89 and 107 are connected directly to the source of 110 volt 60 cycle current. In this circuit motor 107 is connected directly across wires 96 and 98 and relay 97 is omitted.

Figure 9:
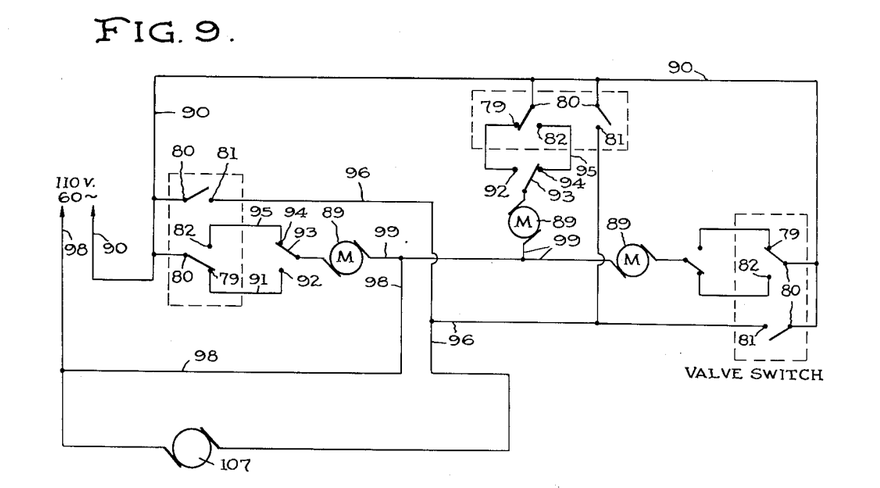
Fig. 9 is a schematic circuit diagram illustrating a modification of the circuit arrangement shown in Fig. 7 wherein the low voltage relay shown in Fig. 7 is eliminated and the external electrical load is operated directly by the associated motor control switches, said switches being connected to the high voltage electrical power supply.

Fig. 9 shows schematically a circuit similar to that of Fig. 7 but for use where the rotary switches and motors 89 and 107 are connected directly to the source of 110 volt 60 cycle current. In this circuit motor 107 is connected between wires 96 and 98 and relay 97, switch 105 and transformer 103 are omitted.

A suitable cylindrical cover 108 may be provided to enclose the valve motor assembly and control switches described in the foregoing, said cover being removably secured to base plate 25 by suitable means, as by screws 109. An aperture 110 is provided in base plate 25 and cooperates with slot 48 in terminal plate 43 to receive the several wires of the circuit described above.

Referring now to the damper valve embodiment of the invention illustrated in Figs. 10–15, this construction comprises elements which are functionally equivalent to, and in some instances structurally the same as, the principal elements of the embodiment of Figs. 1–6, but differs from the latter in certain details, such as the manner in which the motor and switch assembly are supported and the form of the driving connection between the motor and the valve, and in the addition of two contacts to the motor control switch unit which improve the operational reliability of the device.

Figures 10, 11, 13:
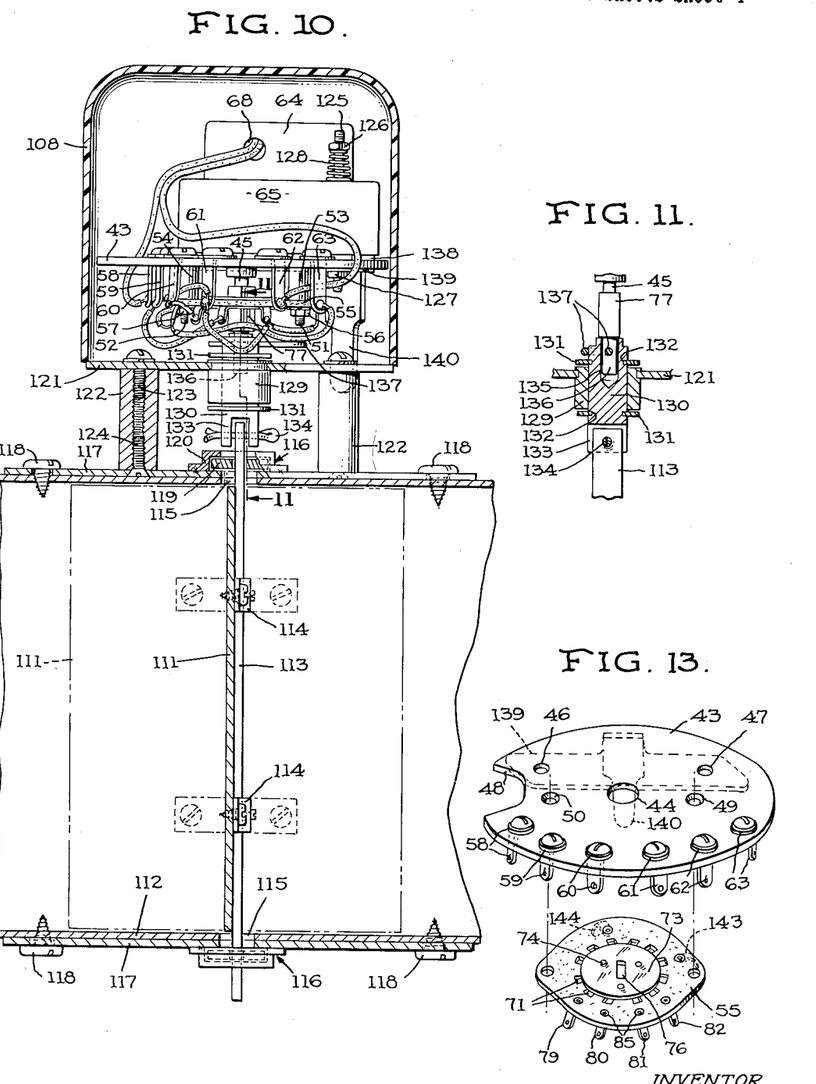
Fig. 10 is a side view, partly in section, of another embodiment of the invention adapted for use in connection with a damper type valve for controlling the flow of warm or cool air through a duct forming part of a zoned heating and/or cooling system, this view showing the damper in closed position and omitting the external electrical wiring in the interest of clarity.
Fig. 11 is a fragmentary sectional view of the separable, self-aligning coupling between the motor driven shaft and the damper valve stem of the embodiment of Fig. 10, taken substantially on the line 11—11 in the latter figure.
Fig. 13 is an exploded perspective view of the motor and terminal plate and the motor control switch unit of Figs. 10 and 12.
Figure 12:
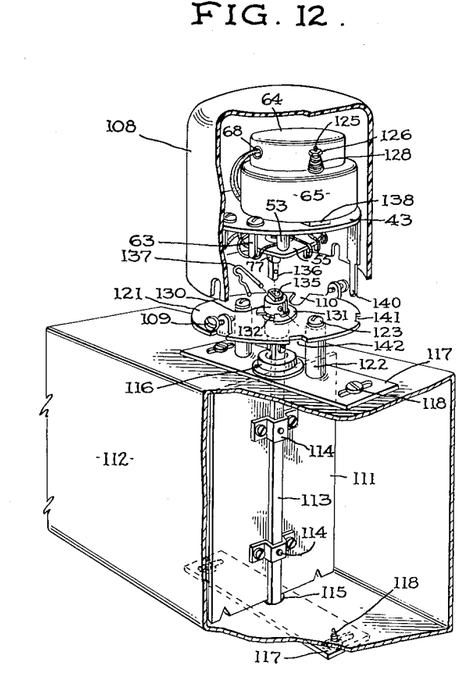
Fig. 12 is a partially exploded and broken away perspective view of the embodiment of Fig. 10.

As shown best in Figs. 10 and 12, a damper valve 111 is mounted in a conduit 112 for rotation therewithin through 360°, the conduit forming part of what, for illustrative purposes, will be assumed to be a zoned warm air heating system. Although, in the form shown, the rotary vane of damper 111 and the conduit 112 are rectangular in shape, it will be understood that the invention is equally applicable to round duct installations or conduits of any other suitable cross section. In the embodiment illustrated, damper valve 111 is fixed to a vertically extending rod or stem 113 of rectangular cross section by means of hat-type brackets 114, the ends of rod 113 extending outwardly through openings 115 in the top and bottom walls of conduit 112, and through bearings 116 carried by mounting plates 117 which are adjustably secured to conduit 112, as by screws 118, along center lines with the run of the conduit. Each bearing 116 comprises a circular collar 119 having a rectangular opening in the center thereof to receive damper rod 113 and an annular cap 120 which is welded or otherwise suitably fixed to mounting plate 117 and overlies the periphery of collar 119 so as to permit the latter to rotate while at the same time restraining axial movement thereof.

The valve actuating motor and control switch assembly are mounted on a plate 43 above a circular base plate 121 which is removably connected to and supported above the upper bearing mounting plate 117 by means of spacers 122 and screws 123 and 124, said screws passing through base plate 121 and mounting plate 117, respectively, and engaging the internally threaded bores of the spacers. Base plate 121 carries centrally thereof a coupling mechanism for interconnecting the upper end of damper rod 113 and the lower end of a shaft 45 which, as in the previously described embodiment, is driven by a unidirectional electric motor in casing 64 through reduction gearing housed in casing 65. Casings 64 and 65, preferably formed as an integral unit, are secured to the plate 43 by bolts 125 which pass through gearing casing 65 and openings 46 and 47 in plate 43, and nuts 126 and 127 which are threaded onto the upper and lower ends, respectively, of said bolts. In order to provide a vertically yieldable mounting for the actuating motor and gearing, coil springs 128 may be interposed between the top of gearing housing 65 and the nuts 126. The motor and switch assembly are preferably protected by a cover 108 which is removably secured to upstanding ears on base plate 121 by screws 109, and the base plate is provided with a slot or aperture 110 which cooperates with a similar slot 48 in the periphery of plate 43 to receive the electrical wiring (not shown in Figs. 10 and 12) which connects the motor and motor control switch unit to the controlling thermostat, the power source and the external load.

As shown in Figs. 10, 11 and 12, the coupling mechanism interconnecting driving shaft 45 and damper rod 113 comprises a bearing sleeve 129 which is fixed to base plate 121 centrally thereof in any suitable manner, and a coupler stem 130 which is loosely journaled in said sleeve. Coupler stem 130 is restrained against all but a relatively small amount of axial movement relative to sleeve 129 by means of a pair of spring washers 131 which are removably engaged in annular grooves 132 formed in the periphery of stem 130 immediately above and below the ends of sleeve 129. The lower end of the coupler stem is bifurcated as indicated at 133 to receive the upper end of damper rod 113 which is detachably connected to said stem by a cotter pin 134 passing through aligned holes in the damper rod and the bifurcated portion of the stem. The upper end of coupler stem 130 is provided with an axially extending socket 135 of flatted cylindrical form which is adapted to receive a similarly flatted cylindrical extension 136 of shaft 45 at the lower end of shaft 45. Extension 136 of shaft 45 is separably connected to coupler stem 130 by a hairpin type cotter 137 having a straight arm which passes through aligned holes in extension 136 and the recessed portion of stem 130, and a corrugated arm which frictionally engages the outer surface of said stem.

As in the valve of Figs. 1–6, the motor supporting plate 43 of the damper construction of Figs. 10–15 is made of electrical insulating material and carries the terminal elements 58, 59, 60, 61, 62 and 63 to which the thermostat, power and external load leads are adapted to be connected. This plate also supports the switch plate 55 of the motor control switch unit by means of bolts 51 and 52 which pass through holes 49 and 50 in plate 43, spacers 53 and 54, and nuts 56 and 57. However, unlike the previously described embodiment, plate 43 of the device illustrated in Figs. 10–15 is not fixed to base plate 121, but is removably supported thereabove as a result of the seating of flatted extension 136 of shaft 45 in the socket 135 of coupler stem 130, the shoulder formed by the junction between the substantially rectangular head 77 of shaft 45 and extension 136 resting on the upper end of stem 130 which in turn transfers the weight of the assembly carried by plate 43 to base plate 121 through the upper spring washer 131. With this construction, the plate 43 and the motor and switch assembly supported thereby may be removed from and replaced on the base plate 121 as a unit. The limited amount of axial and lateral movement which coupler stem 130 is permitted to have relative to bearing sleeve 129, and the fork-type connection between the coupler stem and the damper rod 113, both contribute to the flexible, self-aligning character of the drive between the motor and the damper.

In order to strengthen plate 43 against warping or distortion due to humidity and temperature changes, a metal reinforcing plate 138 may be interposed between the botton of gearing casing 65 and the upper surface of plate 43, extending diametrically across the latter and having holes therethrough to receive the bolts 125. A similar plate 139 may be disposed beneath plate 43 and held against the bottom thereof by nuts 127.

Plate 43 and the motor and switch assembly carried thereby are maintained in properly oriented position relative to base plate 121 by means of a vertically extending tongue 140 which projects downwardly from lower reinforcing plate 139 into a slot 141 formed in the periphery of the base plate. As indicated in Fig. 12, base plate 121 is also provided with a second tongue receiving slot 142 located at a position 90° away from slot 141 in a clockwise direction. With this arrangement, it is possible to open or close damper valve 111 manually in the event of a power failure by springing tongue 140 out of slot 141 and rotating the entire motor and switch assembly carried by plate 43 through 90° in a clockwise direction until tongue 140 reseats in slot 142. Due to the coupling between shaft 45 and damper rod 113 and the fact that, when the motor is unenergized, the reduction gearing effectively locks shaft 45 to plate 43, such a rotation of said plate will result in an equivalent rotation of the damper valve.

The motor control switch unit of Figs. 10–15 is identical to that of the previously described embodiment illustrated in detail in Figs. 3, 5 and 6, except for the addition to switch plate 55 of two more fixed switch elements or contacts 143 and 144 which, as previously mentioned, are adapted to prevent the valve from stalling in partially open or closed position in the event that the controlling thermostat should be reset while the motor is driving the valve toward open or closed position.

Figure 14:
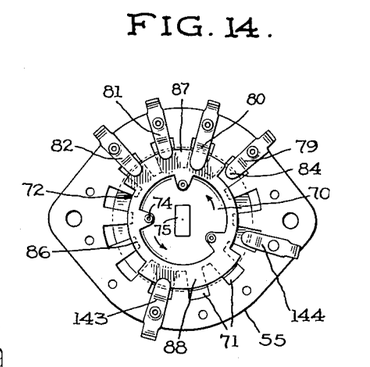
Fig. 14 is a bottom plan view of the motor control switch unit.
Figure 15:
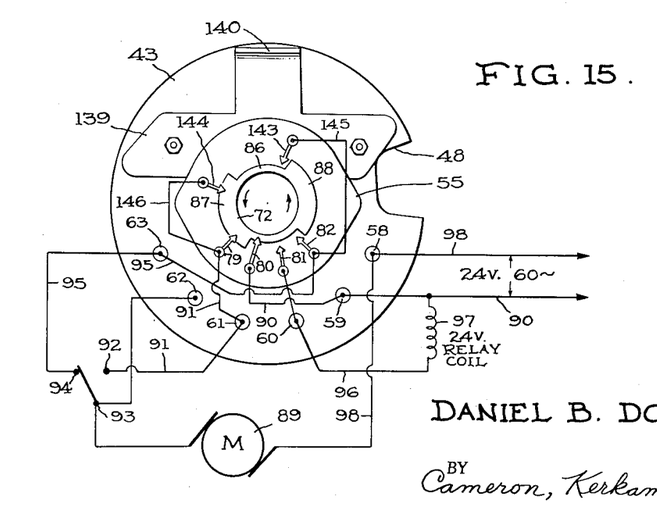
Fig. 15 is a schematic circuit diagram of the embodiment of Figs. 10-14 showing the electrical connections between the motor control switch unit, the motor, the power source, the controlling thermostat and the external load.

As shown best in Figs. 14 and 15, contacts 143 and 144 are of the same radial length as contacts 79, 81 and 82, and are so positioned relative to contacts 79 and 82, respectively, that, within a few seconds after the motor 89 is energized to drive the valve, through engagement of either contact 79 or contact 82 with one of segments 87 and 88 of switch disc 72, disc 72 will have rotated sufficiently in a counterclockwise direction to bring the other segment into engagement with either contact 143 or contact 144. These positions are also such that, just before segment 87 or 88 moves out of engagement with contact 79 or contact 82 so as to open the motor circuit and bring the valve to rest in either open or closed position, the other segment moves out of engagement with contact 144 or 143, as the case may be. In the switch unit illustrated, wherein each of segments 87 and 88 has an arcuate extent of approximately 100° and contacts 79, 80, 81 and 82 are equally spaced at positions approximately 30° apart, contacts 143 and 144 are located at positions approximately 150° in a clockwise direction from contacts 79 and 82, respectively. As shown in Fig. 15, contact 143 is electrically connected by a wire 145 to contact 82 and thence, via wire 95 and terminal 63, to side 94 of switch 93, while contact 144 is connected by a wire 146 to contact 79 and thence, via wire 91 and terminal 61, to side 92 of said switch.

Except for the addition of contacts 143 and 144 and the inclusion of a showing of plate 43 and its terminals 58 through 63, the circuit diagram of Fig. 15 is the same as that of Fig. 6, and the method of operation of the circuit is basically the same as that previously described in connection with the latter figure. The only difference in operation, resulting from the addition of contacts 143 and 144, is that, with the modified arrangement of Fig. 15, if the thermostatic element of switch 93 should be reset so as to change the position of its switch arm at any time while the motor 89 is energized and is moving the valve from closed to open position, or vice versa, except during about five seconds immediately following energization and immediately preceding deenergization of the motor, the circuit is so conditioned that both sides 92 and 94 of the thermostatic switch are live and the motor will continue to run until the valve is either fully open or fully closed.

It will be understood that the circuit of Fig. 15 may be modified similarly to Fig. 8 by connecting the rotary switch and motor 89 directly to a source of 110 volt 60 cycle current, connecting the motor 107 of the heating medium circulating pump directly across wires 96 and 98, and omitting relay 97, and that the zone control circuits of Figs. 7 and 9 are applicable to the damper valve embodiment of the invention illustrated in Figs. 10–15 in the same manner as they are to the embodiments of Figs. 1–6 and 8.

It should now be apparent to those skilled in the art that by the present invention I have provided novel electrically actuated rotary valves for zoned heating and/or cooling systems which in every way satisfy the several objectives described above and which distinguish the present invention from the prior art.

Changes in or modifications of the above-described illustrative embodiments of this invention may now be suggested without departing from the present inventive concept. Reference should therefore be had to the appended claims to determine the scope of this invention.

This is a continuation-in-part of my application Serial No. 671,323, filed July 11, 1957, now abandoned.

What is claimed is:

1. An electrically operated rotary valve for controlling the flow of a heating or cooling medium through a conduit comprising a rotary valve member adapted to be mounted in said conduit for rotation therewithin through 360°, a stem connected to said rotary valve member, a base plate attached to said conduit having an opening therein coaxial with said stem, a second plate mounted above said base plate, a rotary switch positioned between said base plate and said second plate, a unidirectional electric motor mounted on said second plate, and a shaft driven by said motor extending through said second plate and said rotary switch and drivingly connected to said switch and said stem for unidirectional corotation of said switch and said rotary valve member.

2. A valve as described in claim 1 including locking means between said conduit and said base plate, said locking means being so constructed and arranged that said base plate and said second plate, said switch and said motor attached thereto and said rotary valve member, may be manually detached from and re-attached to the said conduit.

3. A valve as described in claim 2 in which the said locking means is engaged and disengaged by rotating said base plate with respect to said conduit by less than one complete revolution.

4. A valve as described in claim 1 including a retainer plate carried by said base plate, said rotary valve member passing through and positioned with respect to said base plate and in self-aligning relationship to said conduit by said retainer plate.

5. A valve as described in claim 1 including separable key and slot driving means between said valve stem and said shaft.

6. A valve as described in claim 1 including a rotatable contact element for said switch, said contact element and said rotary valve member being coaxially driven by said shaft.

7. A valve as described in claim 1 including a separable flexible driving engagement between said shaft and said valve stem for manual removal of said base plate and associated electrical structure without affecting the mechanical operation of the valve.

8. A valve as described in claim 1 in which said base plate supports said second plate, said switch and said motor in a single sub-assembly, said sub-assembly being manually removable from said conduit.

9. In an electrically actuated rotary valve including a casing having an inlet port and an outlet port and a rotary valve member mounted for rotation in the casing between the ports, a locking plate secured to said casing, a valve stem for said rotary valve member, a base plate surrounding said valve stem, a second plate carried by and spaced from said base plate, a unidirectional electric motor mounted on said second plate, a rotary switch mechanism carried by and spaced from said second plate adjacent said base plate, a shaft driven by said motor extending through said second plate and through said rotary switch mechanism for rotation thereof and into driving engagement with said valve stem for unidirectional co-rotation of said switch mechanism and said valve stem, and means for releasably locking said base plate to said locking plate.

10. A valve as described in claim 9 including an extension on said casing internally recessed to receive said rotary valve member and on which said locking plate is mounted, and a gasket on said rotary valve member forming a fluidtight seal with the wall of said recess.

11. A valve as described in claim 9 including an annular groove in said valve stem, an apertured member mounted on said base plate and receiving said valve stem, and means engaging said annular groove for locking said valve stem against axial movement with respect to said base plate.

12. A valve as described in claim 9 wherein said rotary switch mechanism includes a fixed centrally apertured switch plate, a plurality of switch contact elements mounted on said switch plate about the periphery of said aperture, and a rotatable switch contact element drivably connected to said shaft for rotation into and out of engagement with the contact elements mounted on said switch plate.

13. A valve as described in claim 9 wherein said rotary switch mechanism includes a fixed centrally apertured switch plate of electrically non-conducting material, a plurality of metallic switch contact elements mounted on said switch plate about the periphery of said aperture, a disc of electrically non-conducting material mounted in said aperture for rotation by said shaft, and a metallic switch contact element carried by said disc for rotation into and out of engagement with the contact elements mounted on said switch plate.

14. A valve as described in claim 9 in which said locking means includes diametrically opposed ears on said locking plate and diametrically opposed oppositely and downwardly extending brackets on said base plate adapted to receive said ears.

15. A valve as described in claim 9 including a tongue on the end of said shaft and a slot in the end of said valve stem receiving said tongue.

16. An electrically operated mechanism for actuating a valve of the type having a rotary valve member mounted in a conduit for rotation therewithin through 360° to control the flow of a heating or cooling medium through said conduit comprising a base plate having an opening therein adapted to be attached to said conduit with said opening coaxial with the axis of rotation of said valve member, a second plate mounted above said base plate, a rotary switch positioned between said base plate and said second plate, a unidirectional electric motor mounted on said second plate, a shaft driven by said motor extending through said second plate and said rotary switch and drivingly connected to said switch, and means for drivingly connecting said shaft to said rotary valve member for unidirectional co-rotation of the latter and said switch.

17. A valve actuating mechanism as described in claim 16 wherein said means for drivingly connecting said shaft to said rotary valve member includes a coupling member rotatably mounted in the opening in said base plate, and means forming a separable driving connection between said shaft and said coupling member, and wherein said second plate, rotary switch and motor are removable as a unit from said base plate.

18. A valve actuating mechanism as described in claim 16 wherein said rotary switch includes a centrally apertured switch plate through which said shaft extends, a plurality of fixed contact elements mounted on said switch plate about the periphery of said aperture, and a rotatable contact element drivably connected to said shaft for rotation relative to said fixed contact elements, said rotatable contact element comprises a central circular portion and a pair of diametrically opposed segmental extensions each having an arcuate extent in excess of 90°, and the fixed contact elements include a first element having engagement at all times with the central circular portion of said rotatable element, second and third elements so located as to engage said segmental extensions at points 90° apart, and a fourth element so located as to engage said segmental extensions at a point intermediate the points of engagement of said second and third elements.

19. A valve as defined in claim 18 including fifth and sixth fixed contact elements electrically connected to said second and third elements, respectively, and so located as to engage said segmental extensions at points approximately 150° distant from the points of engagement of said third and second elements, respectively, in the direction opposite that in which said rotatable contact element is rotated.

20. An electrically actuated rotary damper for controlling the flow of heating or cooling air through a conduit comprising a rotary damper adapted to be mounted in said conduit for rotation therewithin through 360°, an operating rod fixed to said damper, a pair of bearing mounting plates attached to said conduit at diametrically opposite points, bearings carried by said mounting plates through which the ends of said damper rod extend, a base plate attached to one of said bearing mounting plates having an opening therein coaxial with said operating rod, a second plate mounted above said base plate, a rotary switch mechanism carried by said second plate and positioned between the latter and said base plate, a unidirectional electric motor mounted on said second plate, a shaft driven by said motor extending through said second plate and said rotary switch mechanism and drivingly connected to the latter, and a coupling member rotatably mounted in the opening in said base plate, said coupling member being drivably connected to said shaft and drivingly connected to said damper rod for unidirectional co-rotation of said switch mechanism and said damper.

References Cited in the file of this patent
UNITED STATES PATENTS

| | | |
|---|---|---|
| 1,649,023 | Farmer | Nov. 15, 1927 |
| 1,833,774 | Cronk | Nov. 24, 1931 |
| 2,723,830 | Markley | Nov. 15, 1955 |